April 7, 1970 R. B. STONE ET AL 3,505,471

EYE PATTERN QUALITY APPARATUS

Filed Jan. 2, 1968 6 Sheets-Sheet 1

INVENTORS
ROGER B. STONE
CHARLES L. JACOBSON
BY Ronald Zibelli
ATTORNEYS

INVENTORS
ROGER B. STONE
CHARLES L. JACOBSON

BY Ronald Zibelli

ATTORNEYS

April 7, 1970 R. B. STONE ET AL 3,505,471

EYE PATTERN QUALITY APPARATUS

Filed Jan. 2, 1968 6 Sheets-Sheet 3

INVENTORS
ROGER B. STONE
CHARLES L. JACOBSON

BY Ronald Zibelli

ATTORNEYS

INVENTORS
ROGER B. STONE
CHARLES L. JACOBSON
BY Ronald Zibelli
ATTORNEYS

EYE PATTERN QUALITY APPARATUS

Filed Jan. 2, 1968 6 Sheets-Sheet 5

INVENTORS
ROGER B. STONE
CHARLES L. JACOBSON
BY
ATTORNEYS

EYE PATTERN QUALITY APPARATUS

Filed Jan. 2, 1968

INVENTORS
ROGER B. STONE
CHARLES L. JACOBSON
BY Ronald Zebell
ATTORNEYS

United States Patent Office 3,505,471
Patented Apr. 7, 1970

3,505,471
EYE PATTERN QUALITY APPPARATUS
Roger B. Stone, Webster, and Charles L. Jacobson, Pittsford, N.Y., assignors to Xerox Corporation, Rochester, N.Y., a corporation of New York
Filed Jan. 2, 1968, Ser. No. 695,253
Int. Cl. H04l 25/02
U.S. Cl. 178—69 9 Claims

ABSTRACT OF THE DISCLOSURE

A synchronous facsimile digital data transmission system operated with telephone lines utilizing circuitry to evaluate automatically the quality of the communication link and to generate a signal to command the insertion of one of a plurality of equalizers into the facsimile system, wherein the evaluation circuitry employs rectifiers to reference the voltage levels of a multi-level synchronous signal to a common reference level and employs a capacitor to measure the maximum deviation of signal amplitude from the common reference level to provide an indication of the quality of eye patterns formed from the synchronous signals.

BACKGROUND OF THE INVENTION

The present invention relates to data transmission systems and specifically to method and apparatus for automatic selection of an equalizer for a synchronous digital facsimile transmission system.

Data transmission systems utilize equalizers to compensate for the electrical characteristics of a transmission medium. In a synchronous facsimile system it is necesasry to utilize equalizers to obtain a pass-band signal of sufficient quality to ensure accurate reproduction of graphic information in a facsimile receiver. Facsimile system using telephone lines, for example, require the quality of pass-band signals to exceed that required for normal voice reception because of the greater sensitivity to signal amplitude and phase distortion of a facsimile unit. The common technique for determining whether an equalizer is satisfactorily compensating for the electrical characteristics of a transmission medium is to observe an eye pattern formed from synchronous base-band signals. An eye pattern is obtained by making a timed photographic exposure of base-band signals displayed on an oscilloscope. The resultant photograph is the familiar eye pattern with its shape indicating the quality of the pass-band signals and in turn the effectiveness of an equalizer. The shape of the eye pattern indicates whether a designer need adjust a variable equalizer or insert a new equalizer into the data transmission system to adequately compensate for the characteristics of a particular communication link.

Today there is a growing use of synchronous digital facsimile systems with switched communication networks such as the vast telephone system in the United States and other countries. In utilizing the switched telephone network, for example, it is rare if the same lines are successively used to connect remotely located facsimile units. It is desirable, therefore, to test the effectiveness of an equalizer prior to the transmission of data to insure that the characteristics of a randomly selected telephone line are adequately compensated. The high rental cost of telephone lines dictates that the testing and compensating be accomplished in the shortest possible time, i.e. automatically. The technique of photographing an oscilloscope display to obtain an eye pattern is not readily adaptable to automation. It remains desirable, however, to evaluate the eye pattern because it offers a reliable indicator of the quality of synchronous data transmission.

It is accordingly an object of the present invention to test and compensate automatically for the characteristics of a synchronous data transmission system.

It is a further object to determine the quality of eye patterns associated with synchronous digital signals.

It is a further object to compensate automatically in a synchronous digital facsimile data transmission system, for the characteristics of a transmission medium in response to determining the quality of an eye pattern.

It is a further object to improve facsimile data transmission systems.

It is a further object to automatically select an equalizer that matches the characteristics of a randomly selected transmission medium.

It is a further object of the present invention to evaluate the effectivenes of a transmission medium.

It is a further object to measure the quality of eye patterns formed from base-band signals to indicate the quality of pass-band signals.

DESCRIPTION OF THE DRAWINGS

For a more complete understanding of the invention as well as other objects and further features thereof, reference may be had to the following detailed description in conjunction with the drawings wherein.

SUMMARY OF THE INVENTION

The present invention automatically selects an equalizer from a plurality of equalizers to compensate for the particular characteristics of a randomly selected transmission medium employed with a synchronous digital facsimile system. Synchronous base-band signals of a predetermined pattern are generated in the facsimile transmitter and used to modulate a carrier wave according to any known modulation technique. At the facsimile receiver the transmitted signals are demodulated and tested by an eye quality circuit which produces a signal indicating the quality of eye patterns associated with the signals. If the quality of the eye patterns meets a predetermined standard the equalizer currently under test is maintained in the system and if not a new equalizer from the plurality of equalizers is automatically switched into the system.

DETAILED DESCRIPTION

Figure 1:
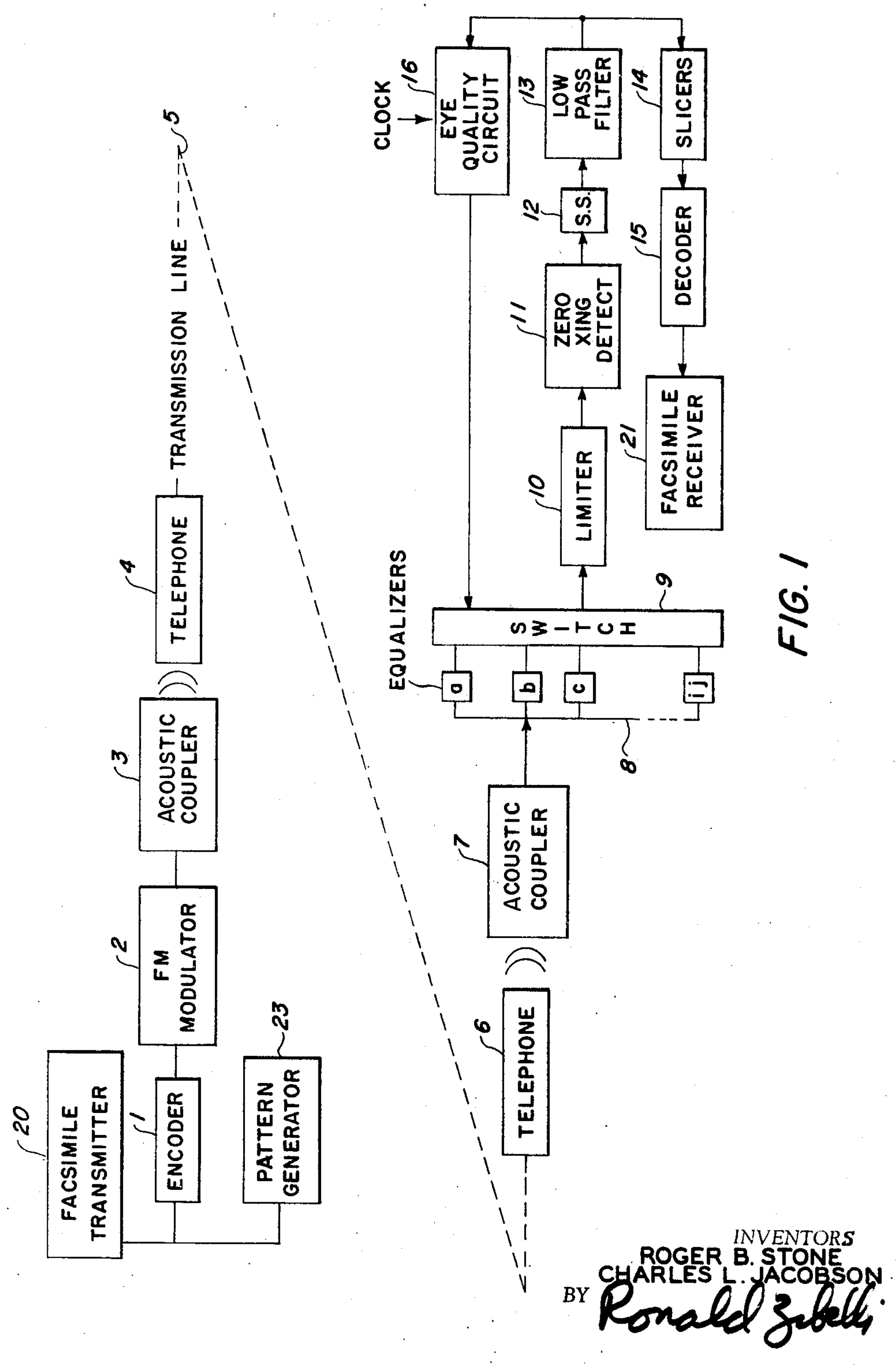
FIGURE 1 is a block diagram of a synchronous facsimile digital data transmission system using a telephone line transmission medium.

Equalizers are used in synchronous digital data transmission systems to compensate for distortion in amplitude and phase vs. frequency characteristics caused by the electrical characteristics of transmission media. By way of example, FIGURE 1 shows a block diagram of a synchronous digital data transmission system using telephone transmission lines. The system shown uses a frequency modulating technique known as frequency shift keying (refer to "Data Transmission," Bennett and Davey, McGraw-Hill, 1965, pp. 29–30). Other modulation techniques such as amplitude or phase modulation may also be used. The equalizer attempts to match the electrical characteristics of a transmission medium to prevent loss of information and to insure proper interpretation of received data. The present invention evaluates the effectiveness of a particular equalizer to correct for the characteristics of a transmission medium and causes a new equalizer to be inserted into the system if the equalizer under test is inadequate.

In FIGURE 1, synchronous two-level base-band signals produced by facsimile transmitter 20 are applied to encoder 1 which produces a four-level synchronous base-band signal. The four-level signals cause frequency modulator 2 to generate four discrete frequencies corresponding to the four levels of the encoder signals. Acoustic coupler 3 converts the frequency modulated (FM) signals into audible tones compatible with telephone 4. Signal information is transmitted to telephone 6 over telephone line 5. Acoustic coupler 7 converts audible tones produced by telephone 6 into FM signals corresponding to those produced by frequency modulator 2.

An example of a four-level synchronous base band signal is shown at p. 29 of "Data Transmission" by Bennett and Davey supra. For an understanding of waveform representation of digital information and of synchronous data transmission systems refer to Chapters 2 and 3 of "Data Transmission" by Bennett and Davey supra.

Figure 3:
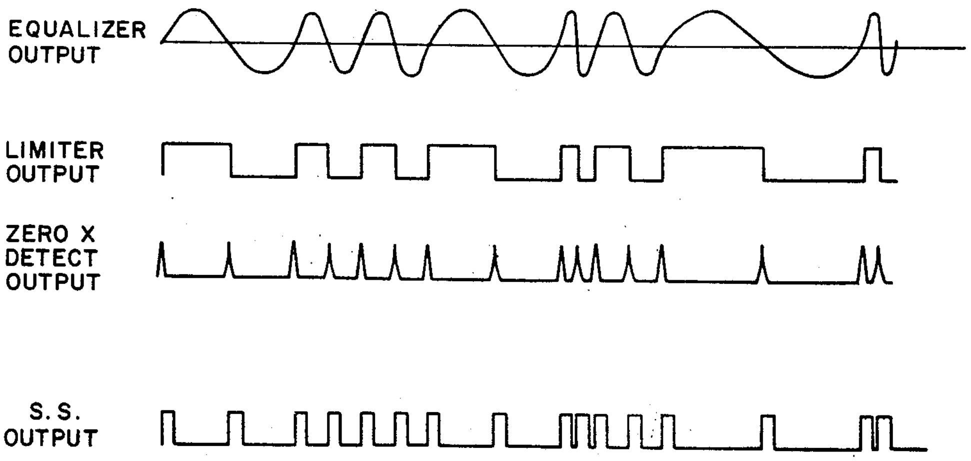
FIGURE 3 illustrates the waveforms of various signals produced by the digital facsimile system.

The FM signals produced by acoustic coupler 7 are applied to equalizer bank 8. Initially, equalizer 8*a* is connected in the circuit by switch 9. Each of the plurality of equalizers in bank 8 have different characteristics for matching the various characteristics encountered in different telephone transmission lines. The equalizers may be of any known design. The output of equalizer 8*a* is applied to limiter 10 (of any known design) which amplifies and limits the signals thereby generating essentially squarewave signals. The various signal waveforms of the components in FIGURE 1 are shown in FIGURE 3.

The output of the limiter is applied to zero crossing detector 11 to generate a spike signal, i.e., a very short duration pulse signal, each time the output of limiter 10 changes state. The output of the zero crossing detector is in turn applied to single shot multivibrator 12 to produce a pulse train of constant width, constant amplitude pulses, occurring at the rate of generation of the spike signals at the zero crossing detector.

Low pass filter 13 operates on the multivibrator pulses to produce four-level synchronous signals corresponding to the signals generated by encoder 1. These signals may be used to form the familiar "eye pattern" (refer to "Data Transmission," Bennett and Davey, supra, p. 140). The low pass filter may be of any conventional design suitable for use with data transmission systems of the present type. The output of the low pass filter is applied to slicers 14. There are three slicers used in the present system, all of conventional design. The slicers produce continuous signals which indicate at any time the region, relative to the four voltage levels, the amplitude of the low pass filter signals occupy. The output of the slicers is monitored by decoder 15 which reconstructs the digital information originally applied to encoder 1 at the transmission end of the facsimile system. Thereafter, the digital information may be used in various manners including a facsimile receiver wherein the information is used to create a graphic record.

The output of low pass filter 13 is also applied to eye quality circuit 16. As mentioned earlier, the four-level synchronous signals produced at the output of low pass filter 13 may be used to form an eye pattern. The eye pattern is indicative of the quality of the transmission medium. Eye quality circuit 16 performs a test on eye patterns to determine if the equalizer coupled to acoustic coupler 7 sufficiently compensates for the characteristics of the telephone line. If equalizer 8*a* provides sufficient compensation, it is left in the circuit. If the eye pattern produced while equalizer 8*a* is in the circuit does not pass an objective test, the output of the eye quality circuit activates switch 9 disengaging equalizer 8*a* and connecting equalizer 8*b* into the circuit. The quality of the eye patterns is tested again and equalizer 8*b* is left in or taken out of the circuit depending on whether the standards of the eye quality circuit are met. The cycling through equalizer bank 8 continues in this fashion until a suitable equalizer is found. If the entire bank of equalizers is tested without finding a satisfactory equalizer, the eye quality circuit informs the system that the particular telephone connection in use is unsuitable for transmission of data thereby requiring the operator to re-dial the connection between the transmitter and receiver telephones.

Figure 2:
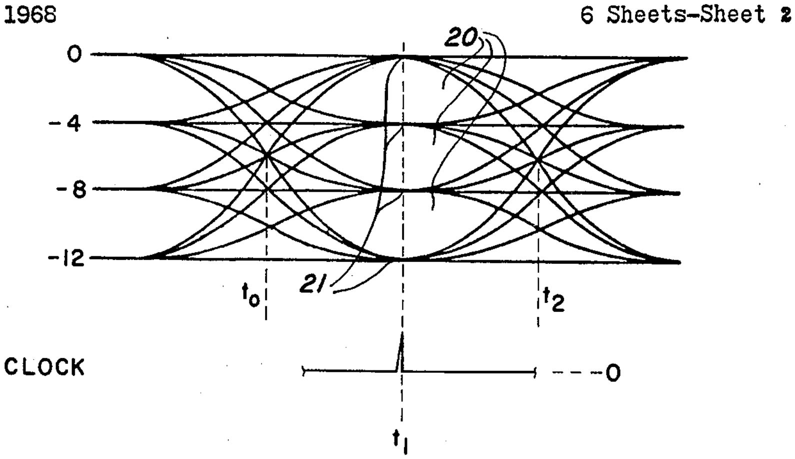
FIGURE 2 is an illustration of an ideal eye pattern associated with a four level synchronous base band signal.

An eye pattern is formed by dividing the output signals of the low pass filter into equal time segments corresponding to the time period or clock rate used by the synchronous data transmission system to separate and therefore interpret the incoming signals. (The number of information symbols per unit time equal a baud, i.e. the clock rate.) The signal waveforms occurring during these time segments are superimposed upon one another to form the eye pattern. If a proper series of signals is generated by encoder 1 (to be discussed later) the waveforms will include all those shown in FIGURE 2. FIGURE 2 illustrates an ideal eye pattern for a four-level synchronous signal which includes sixteen waveforms encountered for transitions between the four voltage levels or information levels of the multi-level synchronous signal. The four voltage levels shown in FIGURE 2, i.e. 0, −4, −8 and −12 volts, are given for illustrative purposes.

The eye pattern in FIGURE 2 is ideal because the amplitude of the signals at the center of the eye (time $t_1$ in FIGURE 2) corresponds exactly with the four voltage levels. If a particular equalizer in the circuit does not satisfactorily compensate for the characteristics of the transmission medium the signal amplitudes at time $t_1$ extend above or below the four voltage levels or information levels. This causes the eye to "close," i.e. the area 20 of the eye is reduced and the line 21 separating the three eyes increases in thickness. The present system measures, at time $t_1$, the amount the low pass filter signals extend above or below the information levels, thereby providing an indication of the quality of an eye pattern.

The eye pattern is obtained by transmitting the digital bit combinations necessary to sequentially produce the sixteen waveforms shown in FIGURE 2. The time period required to generate the waveforms shown in FIGURE 2 is hereinafter referred to as the eye pattern cycle. The eye pattern cycle is repeated until the circuit selects an equalizer which sufficiently compensates for the characteristics of the transmission line.

The data transmission system of FIGURE 1 is shown in use with a facsimile system. The facsimile transmitter 20 scans a document containing graphic information causing the generation of the two level synchronous band pass signals applied to encoder 1. Facsimile receiver 21 converts the pulse information produced by decoder 15 into a signal form suitable for reproducing the graphic information on a copy sheet. The operation of a facsimile system of this type is explained in an application by Ian R. Woodward et al., titled "Facsimile Communication System," filed Aug. 15, 1966, Ser. No. 572,493, assigned to the assignee of the present application.

In a facsimile system, the signals comprising an eye pattern may be generated by inserting a document into the facsimile scanner that will cause production of a series of band-pass signals that lead to the various waveforms shown in FIGURE 2 when processed by low pass filter 13. Alternatively, a pattern generator is used to accomplish the same results. For example, eye pattern generator 23 shown in FIGURE 1, produces a series of synchronous digital signals required to produce the various transitions between voltage levels at the output of low pass filter 13 necessary to form an eye pattern. A pattern generator and encoder suitable for the above purpose is disclosed in my copending application titled "Data Encoder-Decoder," filed Feb. 2, 1967, Ser. No. 613,571, assigned to the assignee of the present application.

During an eye pattern cycle the eye quality circuit monitors the output of the low pass filter at the center of the eye, i.e. at times corresponding to time $t_1$ as shown in FIGURE 2. The eye quality circuit records the maximum deviation, the amount the low pass filter signals extend beyond the four voltage levels in FIGURE 2. If a deviation exceeds a predetermined limit the particular equalizer under test is rejected and switch 9 (FIGURE 1) connects a new equalizer into the system. The deviations may be measured by using eight parallel circuits, two for each of the four different voltage levels to detect both positive and negative deviations. The system under discussion employs a single circuit which references the various signal outputs to a common voltage level using a folding technique.

Figures 4A, 4B, 4C, 4D:
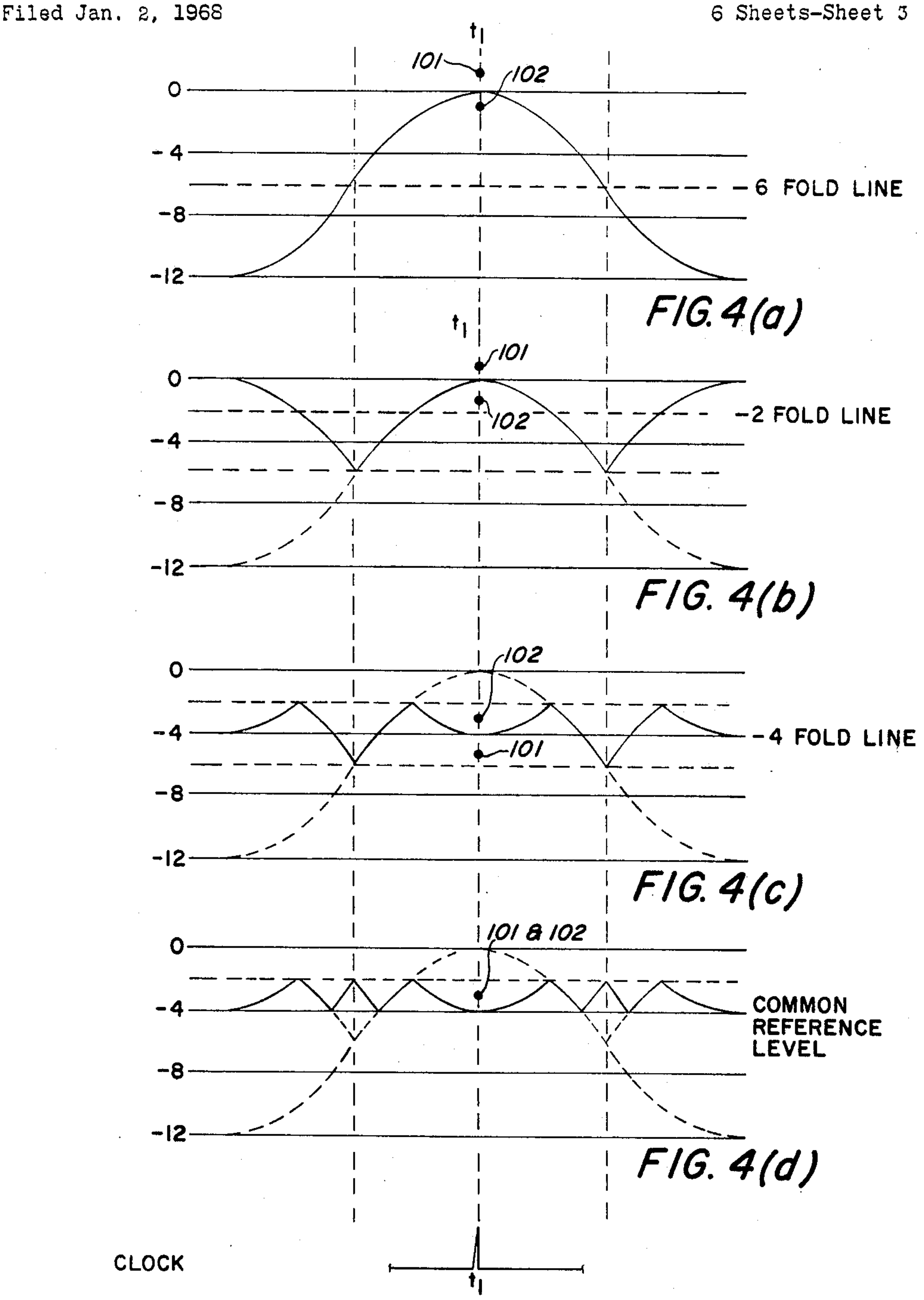
FIGURES 4(*a*)–4(*d*) illustrates a specific eye pattern signal rectified according to a folding technique of the present invention.

FIGURES 4(*a*) through 4(*d*) depict one type of folding technique. An output of low pass filter 13 varying from −12 volts to zero and back to −12 is chosen to illustrate the folding or rectifying technique used in the present invention. FIGURE 4(*a*) shows a signal as it appears at the output of low pass filter 13. FIGURE 4(*b*) shows the signal after it has been folded about a level corresponding to the −6 voltage level, i.e. rectified about a voltage level or reference level of −6 volts. This signal is in turn rectified about a level corresponding to the −2 volt level producing the waveform of FIGURE 4(*c*). The signal waveform in FIGURE 4(*c*) is rectified or folded about a level corresponding to the −4 volt level resulting in the waveform of FIGURE 4(*d*).

Using the above folding technique the various signals produced by the low pass filter are referenced to a level corresponding to the −4 volt level, i.e. a single common voltage level. The amplitude of the low pass filter signals coincide with the −4 volt level at time $t_1$ only in the ideal case and normally extend above the −4 volt level, whether the deviation from the particular voltage level is plus or minus. For example, if the signal in FIGURE 4(*a*) has an amplitude at time $t_1$ corresponding to point 101 in FIGURE 4(*a*), the above folding technique references point 101 above the −4 volt level a like amount after the signal has been folded three times. Similarly, a point 102 indicating a signal amplitude below the zero voltage level at time $t_1$ is also referenced above the −4 volt level, after the signal is folded twice. The maximum deviation from the −4 volt reference level indicates the quality of an eye pattern because it defines the thickness of the line separating the three eyes in FIGURE 2, i.e. it is directly related to the area of the eye.

Determining whether a particular eye pattern is of acceptable quality is a decision for the designer. The designer selects an error limit acceptable for a particular data transmission system and from this the eye pattern required to insure operation within the selected error limit is defined. The required eye pattern produces a particular maximum deviation from the −4 volt reference level. The amplitude of this particular deviation provides a standard against which other eye patterns are evaluated.

In the system of FIGURE 1, the equalizers of bank 8 are chosen to match the characteristics of various possible telephone transmission networks that may be encountered and to match variations in the characteristics of a single transmission network. The equalizers are selected so that at least one of them is likely to match a particular transmission line and this is determined by measuring the maximum deviations from the −4 volt level and comparing this measurement to the amplitude of the deviation for the standard eye pattern mentioned in the above paragraph.

Figure 6A:
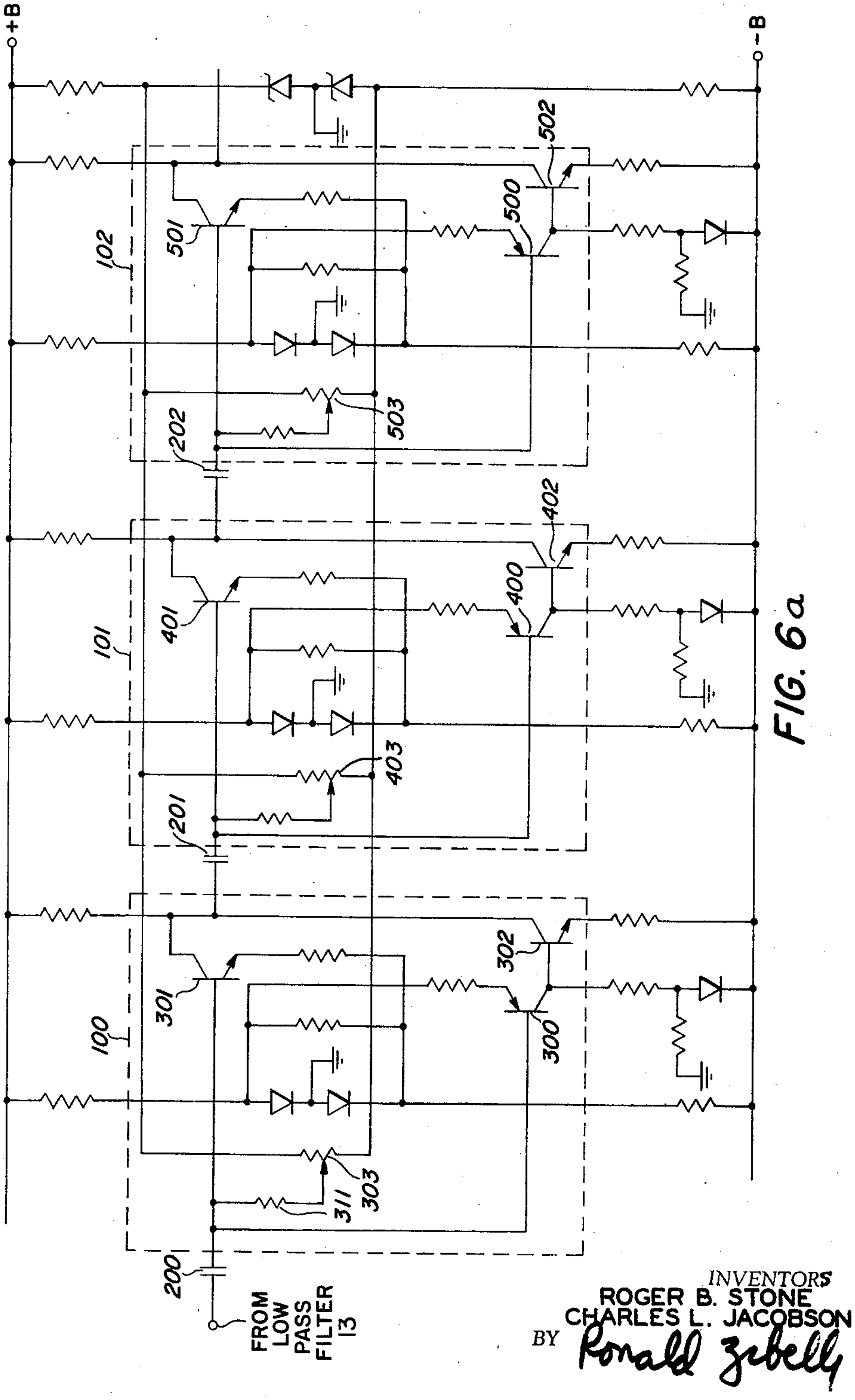
FIGURES 6(*a*) and (*b*) are a schematic of the eye quality circuit of the present invention.
Figure 6B:
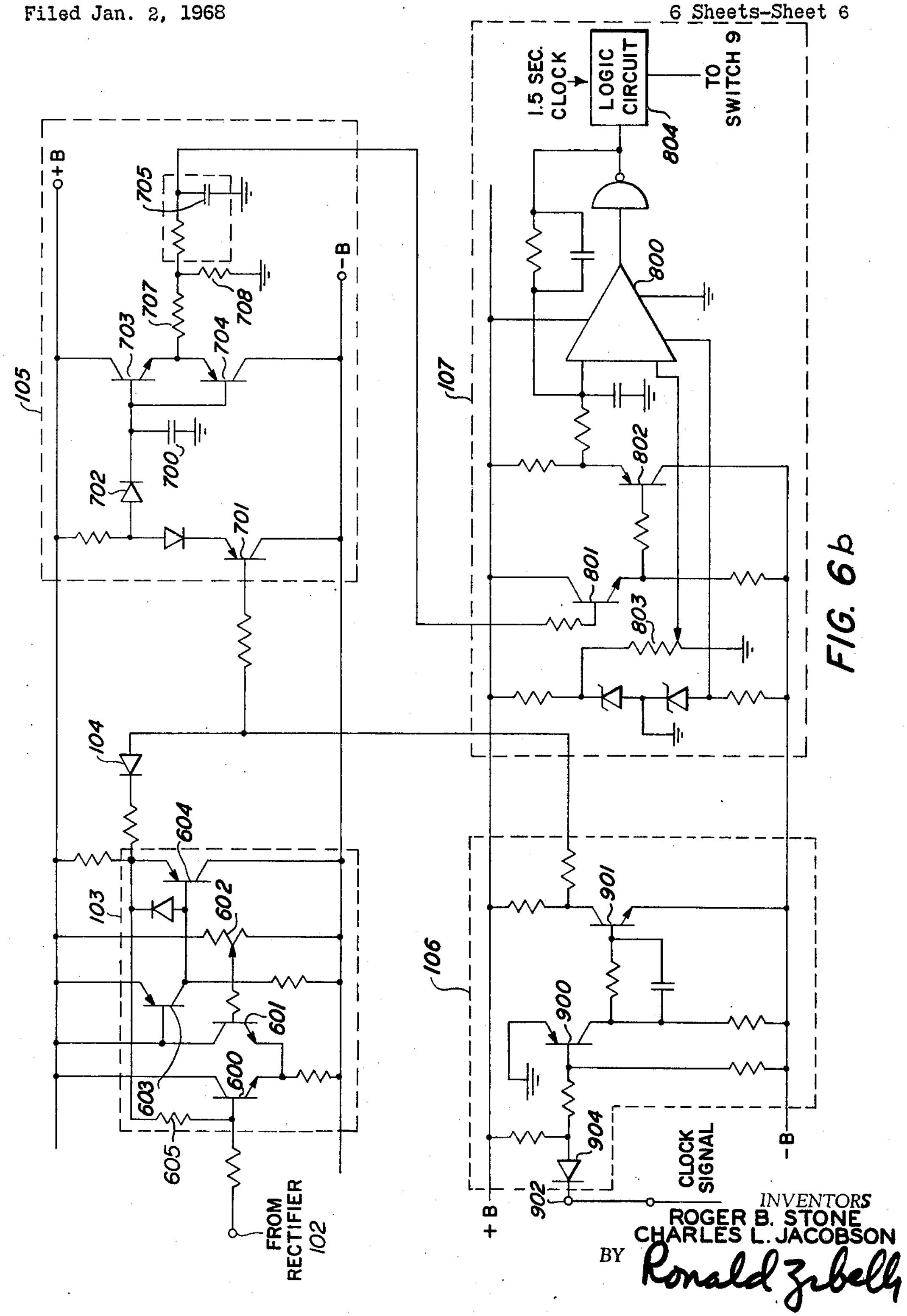

Specific circuitry for measuring the quality of an eye pattern in the above described manner is shown in FIGURES 6(*a*) and (*b*). To aid in describing the operation of the circuit, the signal waveforms in FIGURES 4(*a*) through 4(*d*) are referenced.

The output of low pass filter 13 is coupled to rectifier 100 through capacitor 200. Rectifier 100 rectifies the low pass filter signals, e.g. the signal in FIGURE 4(*a*) and produces at its output (the collector electrodes of transistors 301 and 302) the wave shape shown in FIGURE 4(*b*). The input signal to rectifier 100 is "folded" about a line corresponding to the −6 voltage level.

Rectifier 101 is coupled to rectifier 100 through capacitor 201. Rectifier 101 produces at its output (the collector electrodes of transistors 401 and 402) the folded signal shown in FIGURE 4(*c*). The signal shown in FIGURE 4(*c*) is the waveform in FIGURE 4(*b*) folded about a line corresponding to the −2 voltage level.

The output of rectifier 101 is coupled to the input of rectifier 102 through capacitor 202. Rectifier 102 produces at its output (the collector electrodes of transistors 501 and 502) the rectified or folded signal shown in FIGURE 4(*d*). The waveform shown in FIGURE 4(*d*) is the waveform in FIGURE 4(*c*) folded about a line corresponding to the −4 voltage level.

The output of rectifier 102 is coupled to amplifier 103 where the signal in FIGURE 4(*d*) is referenced to a potential level compatible with recording circuit 105.

The output of amplifier 103 is applied to recording circuit 105 through diode 104 at a time determined by clock circuit 106. Diode 104 and clock circuit 106 act as a gate to control the time at which recordings are made. The gate permits the recording circuit to measure the amplitude of the output of amplifier 103 at a time corresponding to the center of an eye, i.e. time $t_1$ in FIGURES 2 and 4(*a*). This of course assumes that the local clock of the receiver is fully recovered. For a discussion of the recovery of a receiver clock refer to my copending application "Bit Sync Recovery System," filed Sept. 1, 1967, Ser. No. 665,211, assigned to the assignee of the present application.

Recording circuit 105 measures the absolute value of the maximum deviations from the common voltage level thereby providing a measurement of eye pattern quality which is later compared with a standard. The recording circuit is coupled to output circuit 107 where the measured deviation is compared to the standard at comparator 800. If the eye pattern is unacceptable the output circuit 107 commands switch 9 (FIGURE 1) to advance to the next equalizer in bank 8. If the output circuit determines that the eye quality is acceptable then output circuit 107 provides an indication to the receiver that the transmission link with the transmitter is satisfactory and that transmission of data may begin.

Figure 5:
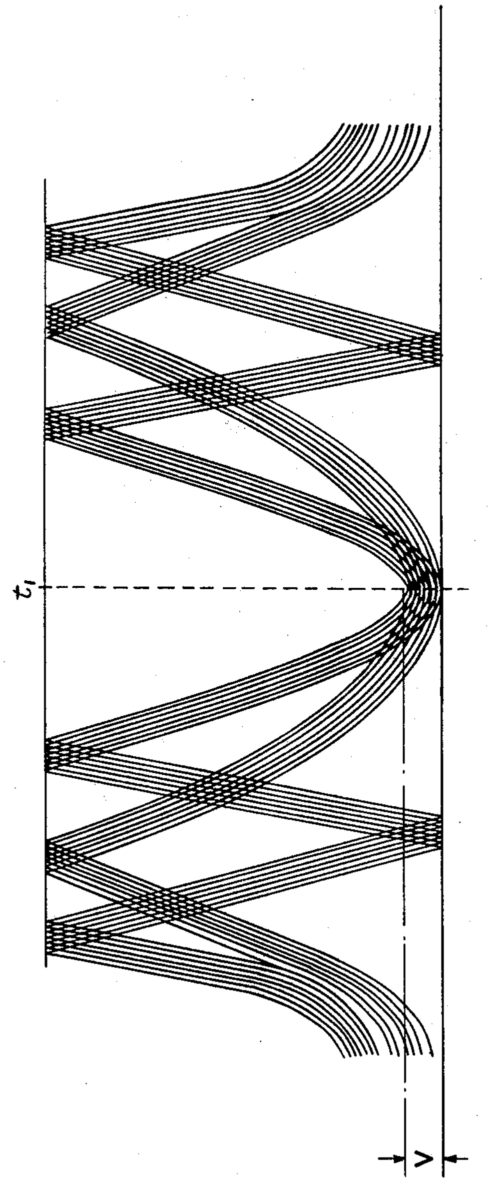
FIGURE 5 illustrates a four-level eye pattern folded according to the present invention.

The folding levels described in connection with the rectifiers are given as examples and the system is not intended to be limited to folding lines corresponding to the particular levels mentioned or the order in which they are used. The same results can be accomplished, for example, by first folding the signal in FIGURE 4(*a*) about a line corresponding to the −8 volt level and thereafter about the lines corresponding to the −4 volt level and −2 volt level. The object is to obtain a waveform such as that shown in FIGURE 5 wherein all the various time segments of the low pass filter signals are referenced to a single voltage level. Referring now to FIGURE 5, the recording circuit measures a voltage proportional to the voltage V, which is the maximum deviation from the common voltage level. (Note that a signal is referenced above the common voltage level whether it undershoots or overshoots its particular information voltage level.) That is, a particular or a combination of particular outputs of low pass filter 13 are overshooting or undershooting a reference level by an amount proportional to the voltage V. The voltage V and the common voltage level define an envelope of the various deviations of the eye pattern signals.

Rectifiers 100, 101 and 102 are substantially identical, therefore the following description of the circuitry of rectifier 100 is also descriptive of the rectifiers 101 and 102. The basic components of the rectifier are the inverting amplifiers or transistors 300, 301, and 302. A signal such as that shown in FIGURE 4(*a*) is AC coupled to rectifier 100 through capacitor 200 which is in turn coupled to the base electrodes of transistors 300 and 301. The potentiometer 303 establishes the DC level of the input signal. Transistor 300 is a PNP transistor and transistor 301 is a NPN transistor.

The signal in FIGURE 4(*a*) varies between zero and −12 volts. This signal, or other signals from low pass filter 13, is AC coupled to rectifier 100 through capacitor 200. Potentiometer 303 is coupled between +B and −B voltage potential sources and the DC level of the input signal is established by the voltage at the variable terminal of the potentiometer applied through resistor 311. The cut-off voltage level for transistors 300 and 301 is ground potential. Since the transistors are of opposite type, i.e. PNP and NPN respectively, transistor 300 is cut-off for input signal voltage levels above ground and transistor 301 is cut-off for signal levels below ground. Adjusting the DC level of the input signal using potentiometer 303 varies the portions of the input signal extending above and below the cut-off levels of the transistors. Potentiometer 303 therefore establishes the signal level about which the input signals are folded or rectified.

The waveform of the signal produced at the collector of transistor 301 is substantially that of FIGURE 4(*a*) above the −6 volt level. Potentiometer 303 is adjusted to establish a DC level for the signal such that portions of the signal waveform corresponding to those below the −6 volt level cut-off transistor 301. FIGURE 4(*a*) is incorrect in that transistor 301 also inverts the signal.

The waveform of the signal produced at the collector of transistor 300 is substantially that of FIGURE 4(*a*) below the −6 volt level. That is, the portions of the signal waveform corresponding to those above the −6 volt level cut-off transistor 300. The collector electrode of transistor 300 is coupled to the base electrode of transistor 302 to invert the signal produced at the collector electrode of transistor 300. Since transistor 300 also effects an inversion of the signal applied to its base electrode, the signal produced at the collector electrode of transistor 302 is the same polarity as the signal at the base electrode of transistor 300.

The collector electrodes of transistors 301 and 302 are coupled together, therefore a signal waveform substantially as in FIGURE 4(*b*) is produced when the signal waveform as shown in FIGURE 4(*a*) is applied to the base electrodes of transistors 300 and 301. The waveform in FIGURE 4(*b*) is not exactly the waveform produced at the transistor 301 and 302 collector electrodes because FIGURE 4(*b*) depicts the waveform for the case where signal levels below the folding line (a line corresponding to the −6 volt line in FIGURE 4(*a*) are rectified whereas the circuit actually rectifies the signal levels above the folding line. That is, the actual waveform produced is the inverse of that in FIGURE 4(*b*).

The function of transistor 301 is to invert a portion of the input signals. The function of the transistors 300 and 302 is to pass the remaining portion of the input signals without inverting the signal. The combined signal formed at the collectors of transistors 301 and 302 is a signal rectified about the reference potential level established by potentiometer 303.

The circuitry of rectifiers 101 and 102 are the same as that described above. However, potentiometers 403 and 503 are adjusted so that the circuits rectify or fold an input signal about voltage levels corresponding to the folding levels in FIGURES 4(*b*) and 4(*c*).

The output of rectifier 102 is coupled to amplifier 103. Amplifier 103 is an operational amplifier which inverts the output of rectifier 102 and establishes a voltage level for the rectifier signal to make it compatible with recording circuit 105. The amplifier output, the emitter electrode of transistor 604, produces a signal having a voltage range compatible with the operation of transistor 701 in the recording circuit.

Transistors 600 and 601 form a differential amplifier. The output of rectifier 102 is applied to the base electrode of transistor 600. Potentiometer 602 is coupled to the base electrode of transistor 601 to provide a constant input to the differential amplifier. The voltage selected by potentiometer 602 establishes the voltage level of the amplifier output signals. Transistor 600, 601, and 603 provide three inversions of the input signal resulting in a single net inversion of the signal at the output of the amplifier. Resistor 605 coupled between the emitter electrode of transistor 604 and the base electrode of transistor 600 is the operational amplifier feedback resistor which establishes the gain of the amplifier.

The output of operational amplifier 103 is applied to recording capacitor 700 in recording circuit 105 through the combined operation of transistor 701, diode 104 and clock circuit 106. The output of operational amplifier 103 is coupled to the base electrode of transistor 701 through diode 104. Transistor 701 is a linear amplifier which generates a signal at its emitter electrode proportional to the signal at the output of amplifier 103 at times corresponding to time $t_1$ in FIGURE 2.

Transistor 701 is normally conducting maintaining its emitter electrode near a −B potential. Transistor 701 is maintained in this saturated state by the voltage at the collector electrode of transistor 901 in clock circuit 106. Transistor 901 is normally conducting maintaining its collector at a −B potential. This −B potential back biases diode 104 and maintains transistor 701 in a highly conductive state.

A clock signal, or timing signal, generated in the transmission system receiver is applied to terminal 902 of the clock circuit. The clock signal appears at terminal 902 as a short duration pulse at time $t_1$ which varies from ground to a potential above ground. The clock signal is normally at ground potential thereby forward biasing diode 904 and causing transistor 900 to conduct which in turn causes transistor 901 to conduct. The near ground potential at the collector of transistor 900 while conducting is applied to the base electrode of transistor 901 to maintain it conducting. The clock signal is at the potential above ground at times corresponding to time $t_1$ in FIGURES 2 and 4(*a*). This positive potential momentarily back biases diode 904 causing transistors 900 and 901 to stop conducting. With transistor 901 turned off its collector rises to a potential near +B thereby forward biasing diode 104 and allowing the output of amplifier 103 to be applied (or pass) to recording circuit 105.

Initially, the charge on capacitor 700 is near ground potential. This means that diode 702 is forward biased when the output of the operational amplifier is reproduced at the emitter electrode of transistor 701, if the output is more positive than ground potential. Transistor 701 is operated as an emitter follower so there is no sign reversal of the output of the operational amplifier. The positive voltage at the emitter electrode of transistor 701 charges capacitor 700 to a potential proportional to the output of the operational amplifier.

During an eye pattern cycle capacitor 700 records the maximum deviation of a low pass filter signal from an information voltage level (levels corresponding to the 0, −4, −8, and −12 volt levels in FIGURE 4(*a*)). For example, if the voltage first applied to the capacitor 700 represents the maximum deviation of a low pass filter signal from an information level then subsequent deviations of less magnitude are prevented from reaching capacitor 700 because diode 702 is backed by the voltage initially placed on capacitor 700.

The discharge path for capacitor 700 is through the base emitter junctions of transistors 703 and 704 and resistors 707 and 708. Transistors 703 and 704 comprise a complementary emitter follower. The voltage on capacitor 700 is coupled through either transistor 703 or 704 to the output circuit 107.

Output circuit 107 comprises comparator 800 where the time average voltage on capacitor 700, which appears at capacitor 705, is compared with a standard voltage. The standard represents the voltage indcating an acceptible eye pattern. The standard voltage is applied to comparator 800 by potentiometer 803. The voltage on capacitor 705 is applied to the comparator through emitter follower transistors 801 and 802. The output of comparator 800 is a two level signal, one level indicating that the voltage on capacitor 705 is lower than that of the standard and that an eye pattern under test is acceptable. If the voltage on capacitor 705 is greater than the standard voltage then the output level of comparator 800 indicates that an eye pattern is not acceptable.

Logic circuit 804 periodically samples the output of comparator 800 to determine if a particular equalizer in bank 8 (FIG. 1) adequately compensates for the characteristics of a particular transmission line. If the comparator indicates that an acceptable eye pattern is not being generated, switch 9 is advanced causing a new equalizer to be inserted into the system. Switch 9 is a stepping switch having a motor (not shown) which advances the switch at periodical intervals, e.g. every 1.5 seconds. The logic circuit 804 interrogates the comparator 800 prior to advancing the switch 9. If the comparator indicates that a satisfactory eye pattern has been obtained the logic circuit inhibits the advancement of switch 9.

In the above manner, the present invention automatically selects an appropriate equalizer for a randomly selected transmission medium. FIGURE 1 depicts the specific case of automatic equalizer selection for a synchronous facsimile data transmission system using telephone lines as the transmission medium.

In the facsimile system shown in FIGURE 1, an eye pattern cycle is continuously generated during an initial run-up period lasting substantially 30 to 45 seconds. The run-up period is provided to first allow the facsimile receiver to synchronize or recover its local clock with the transmitter clock. The automatic selection of an equalizer as herein described is performed during this period (after timing is recovered) as well as establishing other initial parameters for the system prior to the transmission of data. In the facsimile system, the period of an eye pattern cycle is substantially 25 milliseconds and the time constant for the discharge of a voltage on recording capacitor 700 is substantially 100 milliseconds thereby giving rise to the time averaging of the voltage on recording capacitor 700.

The eye pattern formed while a particular equalizer is in the system is repeatedly tested to include the effects of random noise and signal fluctuation. A single eye pattern cycle is sufficient to test an equalizer but it is preferable to repeat the cycle. It is also preferable to generate substantially all the signals of the eye pattern during the testing period although not necessarily in any particular order.

What is claimed is:

1. A synchronous facsimile receiver for operation with modulated signals received at said receiver via any one of a plurality of transmission media each of which may have different transmission characteristics comprising coupling means for coupling to one of said plurality of transmission media, a plurality of equalizers each having different electrical characteristics, switching means for coupling one at a time, each of said equalizers to said coupling means, demodulating means coupled to the equalizer coupled to said coupling means by said switching means to convert said modulated signals to multi-level synchronous signals from which an eye pattern can be formed, an eye quality circuit coupled to said demodulating means to generate an eye quality signal indicative of the quality of eye patterns formed from said multi-level synchronous signals, said eye quality circuit including means to fold said multi-level synchronous signals to reference the multiple levels of said signals to a common reference level, receiver clock signals synchronized with said received modulated signal, gating means coupled to receive said receiver clock signal and coupled to said folding means and to a comparator means to pass said folded signals to said comparator at a time corresponding to a center of an eye pattern, whereby deviations of said folded signals from said common reference level indicate the quality of eye patterns formed from said multi-level signals, and comparator means, coupled to said eye quality circuit and said switching means, to compare said eye quality signal with a standard signal indicative of a predetermined eye pattern quality and to generate a comparator signal to activate said switching means causing a different equalizer to be coupled to said transmission medium when said eye quality signal indicates an eye pattern of less quality than said standard signal.

2. An eye quality circuit according to claim 1 further including means, coupled between said gating means and said comparator means, to limit the signals applied to said comparator means to substantially the maximum deviations of said folded signals from said common reference level.

3. Apparatus for indicating the quality of eye patterns associated with multiple voltage levels, synchronous signals comprising a plurality of rectifying means connected to receive said synchronous signals to reference the multiple voltage levels of said signals to a single voltage level whereby voltage amplitudes of said synchronous signals differing from said multiple voltage levels appear as deviations from said single voltage level, a clock signal synchronized with said received synchronous signal, gating means connected to said plurality of rectifying means and connected to receive said clock signal to pass said deviations of said synchronous signals voltage amplitudes from said single voltage level at a time during the cycle of said clock signal corresponding to the center of an eye pattern formed from said synchronous signals, and recording means coupled to said gating means to measure the deviations of said synchronous signal voltage amplitudes from said single voltage level to provide an indication of eye pattern quality.

4. Apparatus according to claim 3 wherein said recording means includes a capacitor, with first and second terminals, said second terminal coupled to said rectifiers and said first terminal coupled to said single voltage level, said capacitor measuring said synchronous signal deviations as a voltage on said capacitor.

5. Apparatus according to claim 4 wherein said recording means further includes a diode coupled between said capacitor second terminal and said rectifiers to limit to a single polarity, relative to said single voltage level, the voltage on said capacitor.

6. Apparatus according to claim 3 wherein said plurality of rectifying means are coupled to each other in series and the number of rectifiers is at least one less than the number of levels of said multi-lever synchronous signal.

7. Apparatus according to claim 6 wherein said rectifying means comprises means to rectify signals applied to them about a reference voltage level, and means to vary said reference voltage level about which said signals are rectified.

8. Apparatus according to claim 6 wherein said rectifying means comprises first, second, and third inverting amplifiers, with input and output terminals, said first and second amplifiers coupled together at their input terminals, said first and third amplifiers coupled together at their output terminals and said second amplifier output terminal coupled to said third amplifier input terminal, said first amplifier operative on signal voltage levels above a reference voltage level and said second amplifier operative on signal voltage levels below said reference level, and means to vary said reference voltage level.

9. Apparatus for indicating the quality of eye patterns associated with four-level synchronous signals comprising a primary terminal connected to receive said synchronous signals, first, second, third, and fourth capacitors, said first capacitor coupled to said primary terminal to receive said synchronous signals, a first rectifying circuit, with input and output terminals, coupled to said primary terminal at its input terminal to rectify said synchronous signals about a first reference level, a second rectifying circuit, with input and output terminals, coupled at its input terminal to said first rectifier output terminal through said second capacitor, to rectify said synchronous signals about a second reference level, a third rectifying circuit, with input and output terminals, coupled at its input terminal to said second rectifier output terminal through said third capacitor, to rectify said synchronous signals about a third reference level, a first amplifier, coupled to the third rectifier output terminal to reference an electrical signal at said third rectifier output terminal to a common reference level, a clock signal synchronized with said four-level synchronous signals, gating means, coupled to receive said clock signal and coupled to said first amplifier to pass signals from said first amplifier in response to said clock signal, a second amplifier, with input and output terminals, coupled to said gating means at said input terminal, and a diode coupled between said second amplifier output terminal and a first terminal of said fourth capacitor, with a second terminal of said fourth capacitor coupled to said common reference level.

References Cited

UNITED STATES PATENTS

| | | | |
|---|---|---|---|
| 3,213,196 | 10/1965 | Tuck et al. | 178—69 |
| 3,335,223 | 8/1967 | Johannesson et al. | 178—69 |

THOMAS A. ROBINSON, Primary Examiner

U.S. Cl. X.R.

333—18